(12) United States Patent
Urakami (10) Patent No.: US 9,715,722 B2
(45) Date of Patent: Jul. 25, 2017

(54) IMAGE PICKUP APPARATUS THAT PERFORMS TONE CORRECTION, CONTROL METHOD THEREFOR, AND STORAGE MEDIUM

(71) Applicant: CANON KABUSHIKI KAISHA, Tokyo (JP)

(72) Inventor: Hiroyuki Urakami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/870,702

(22) Filed: Sep. 30, 2015

(65) Prior Publication Data

US 2016/0104273 A1    Apr. 14, 2016

(30) Foreign Application Priority Data

Oct. 9, 2014   (JP) .................................. 2014-207843

(51) Int. Cl.
| | |
|---|---|
| *G06K 9/00* | (2006.01) |
| *G06T 5/40* | (2006.01) |
| *G06T 5/00* | (2006.01) |
| *G06K 9/20* | (2006.01) |
| *H04N 1/407* | (2006.01) |

(52) U.S. Cl.
CPC .............. *G06T 5/40* (2013.01); *G06K 9/2081* (2013.01); *G06T 5/009* (2013.01); *H04N 1/407* (2013.01); *H04N 1/4074* (2013.01)

(58) Field of Classification Search
USPC ............. 382/169, 168, 162; 348/223.1, 234; 358/520, 521, 522
See application file for complete search history.

(56) References Cited

U.S. PATENT DOCUMENTS

| | | | | |
|---|---|---|---|---|
| 5,426,517 A | * | 6/1995 | Schwartz | ............. H04N 1/6027 358/520 |
| 9,055,263 B2 | * | 6/2015 | Umeda | .................... H04N 1/60 |

FOREIGN PATENT DOCUMENTS

JP     2006-098614 A     4/2006

* cited by examiner

*Primary Examiner* — Anh Do
(74) *Attorney, Agent, or Firm* — Fitzpatrick, Cella, Harper & Scinto

(57) ABSTRACT

An image pickup apparatus which is capable of setting image quality as desired by a user when performing tone correction according to a luminance histogram of a taken image. A luminance histogram obtaining unit obtains a luminance histogram from image data. A luminance tone correction unit performs tone correction on the image data using a correction curve generated based on the obtained luminance histogram. A user setting unit receives a setting as to a correction intensity of the tone correction from the user and sets parameters for determining coordinate values of control points on the correction curve. A luminance tone control unit generates the correction curve based on the luminance histogram and determines the coordinate value according to the parameters set by the user setting unit.

7 Claims, 8 Drawing Sheets

IMAGE PICKUP APPARATUS THAT PERFORMS TONE CORRECTION, CONTROL METHOD THEREFOR, AND STORAGE MEDIUM

BACKGROUND OF THE INVENTION

Field of the Invention

The present invention relates to an image pickup apparatus, a control method therefor, and a storage medium, and in particular to an image pickup apparatus and a control method therefor which use a control technique of setting image quality as desired by a user when performing tone correction according to a luminance histogram of a taken image, as well as a storage medium.

Description of the Related Art

With conventional image pickup apparatuses, when a shooting environment is foggy or misty, a taken image "hazes" to have low contrast and lack visibility. To solve this problem, a technique for improving a feeling of contrast by correcting tones of luminance levels according to characteristics of a luminance histogram of a taken image. For example, at least one coordinate through which a luminance correction curve for a low-tone range passes and at least one coordinate through which a luminance correction curve for a high-tone range passes are computed based on a luminance histogram of a taken image, and tones of luminance levels are corrected using a luminance correction curve obtained by connecting those coordinates together (see Japanese Laid-Open Patent Publication (Kokai) No. 2006-098614).

Figure 8:
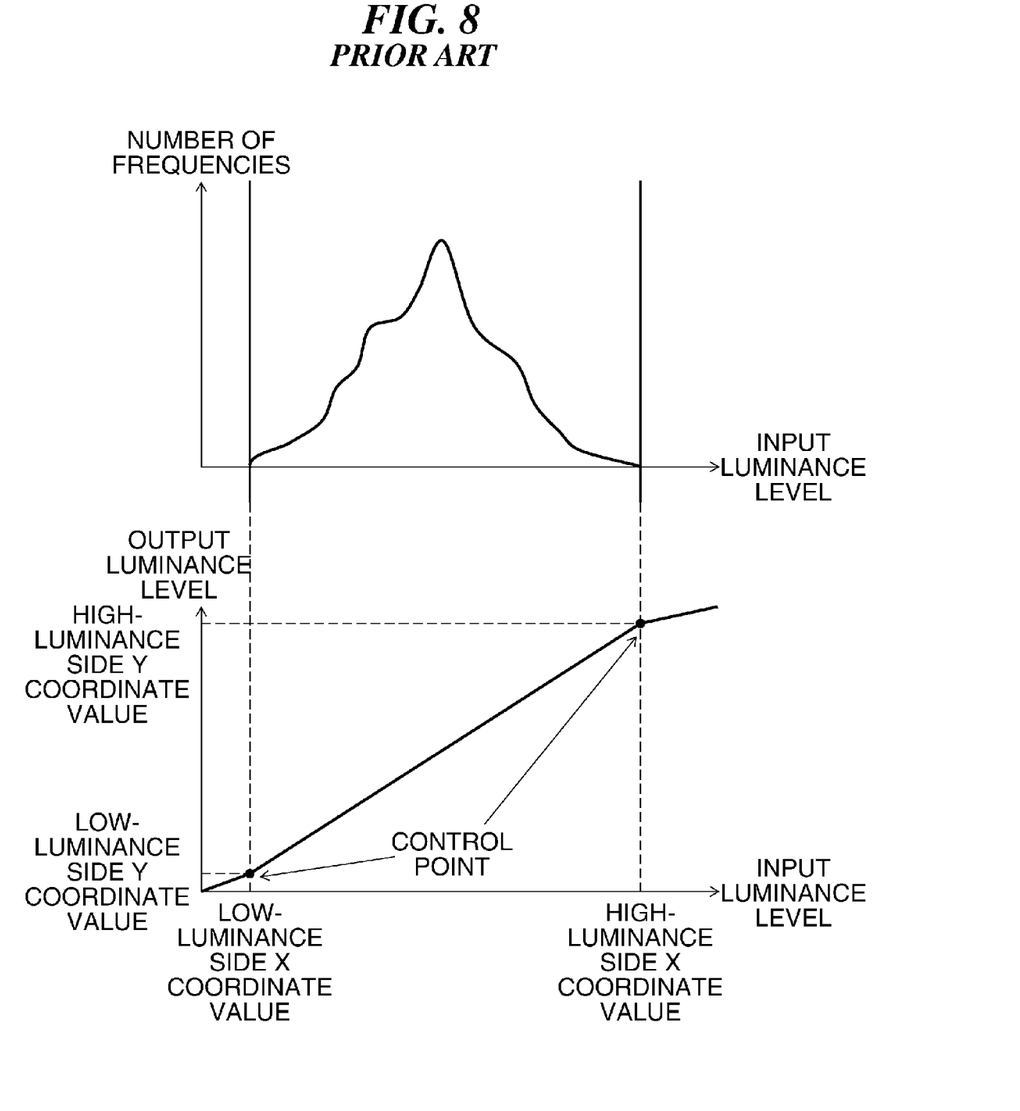
FIG. 8 is a view showing the relationship between a luminance histogram and a tone curve so as to explain a conventional tone correction control method.

The technique described in Japanese Laid-Open Patent Publication (Kokai) No. 2006-098614, however, presents a problem because the degree of correction effect is uniquely determined from a luminance histogram of a taken image as shown in FIG. 8, and hence image quality is determined irrespective of whether or not a user is satisfied.

SUMMARY OF THE INVENTION

The present invention provides an image pickup apparatus and a control method therefor which are capable of setting image quality as desired by a user when performing tone correction according to a luminance histogram of a taken image, as well as a storage medium.

Accordingly, the present invention provides an image pickup apparatus comprising an obtaining unit configured to obtain a luminance histogram from image data, a correction unit configured to perform tone correction on the image data using a correction curve generated based on the luminance histogram obtained by the obtaining unit, a setting unit configured to receive a setting as to a correction intensity of the tone correction from a user and set parameters for determining coordinate values of control points on the correction curve according to the correction intensity, and a tone control unit configured to generate the correction curve based on the luminance histogram and determine the coordinate values according to the parameters set by the setting unit.

According to the present invention, a correction curve stored in advance is multiplied by a correction curve generated based on a luminance histogram to generate a new correction curve. This enables a user to vary the degree of correction effect and set desired image quality when performing tone correction according to a luminance histogram of a taken image.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

A description will now be given of a tone correction method according to a first embodiment of the present invention, which controls x coordinate values and y coordinate values of control points on a tone curve according to settings configured by a user.

Figure 1:
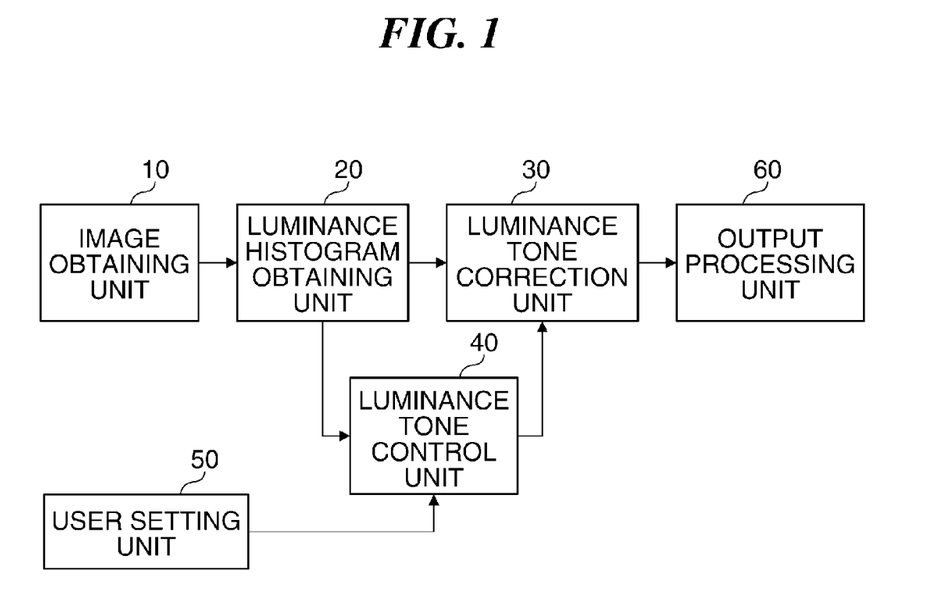
FIG. 1 is a block diagram schematically showing an arrangement of a tone correction unit which an image pickup apparatus according to a first embodiment of the present invention has.

FIG. 1 is a block diagram schematically showing an arrangement of a tone correction unit which an image pickup apparatus according to the first embodiment of the present invention has. It should be noted that component elements of the image pickup apparatus other than the tone correction unit are omitted from this figure.

Referring to FIG. 1, the tone correction unit has an image obtaining unit 10, a luminance histogram obtaining unit 20, a luminance tone correction unit 30, a luminance tone control unit 40, a user setting unit 50, and an output processing unit 60.

The image obtaining unit 10 obtains image data and outputs the same to the luminance histogram obtaining unit 20. It should be noted that the image obtaining unit 10 may obtain image data by receiving image data output from external equipment or may act as an image pickup unit, which has an image pickup device such as a lens group, an image pickup device such as a CCD or a CMOS, and so forth, which are not shown, to obtain image data.

The luminance histogram obtaining unit 20 obtains a luminance histogram showing the distribution of luminance levels from input image data and outputs data on the luminance histogram to the luminance tone control unit 40 while outputting the image data to the luminance tone correction unit 30.

The user setting unit 50 receives a setting as to a correction intensity indicative of an intensity of tone correction from a user. According to the correction intensity set by the user, the user setting unit 50 sets correction intensity parameters for controlling the intensity of luminance tone correction and sends out the correction intensity parameters to the luminance tone control unit 40. There are two correction intensity parameters sent out from the user setting unit 50 to the luminance tone control unit 40. The first one is a parameter (first parameter) for determining x coordinate values of control points in a tone curve, and for example, a size of an area occupied by a low-luminance side and a high-luminance side in a luminance histogram. The second one is a parameter (second parameter) for determining y coordinate values of control points on a tone curve, and for example, an output luminance level of a tone curve. The user setting unit 50 provides control to vary at least one of these two parameters.

The luminance tone control unit 40 generates a tone curve based on data on the input luminance histogram and the correction intensity parameters received from the user setting unit 50 and outputs the generated tone curve to the luminance tone correction unit 30.

The luminance tone correction unit 30 subjects the input image data to tone correction based on the tone curve output from the luminance tone control unit 40.

The output processing unit 60 performs processing so as to receive the image data corrected by the luminance tone correction unit 30 and output the same from the image pickup apparatus.

Figure 2:
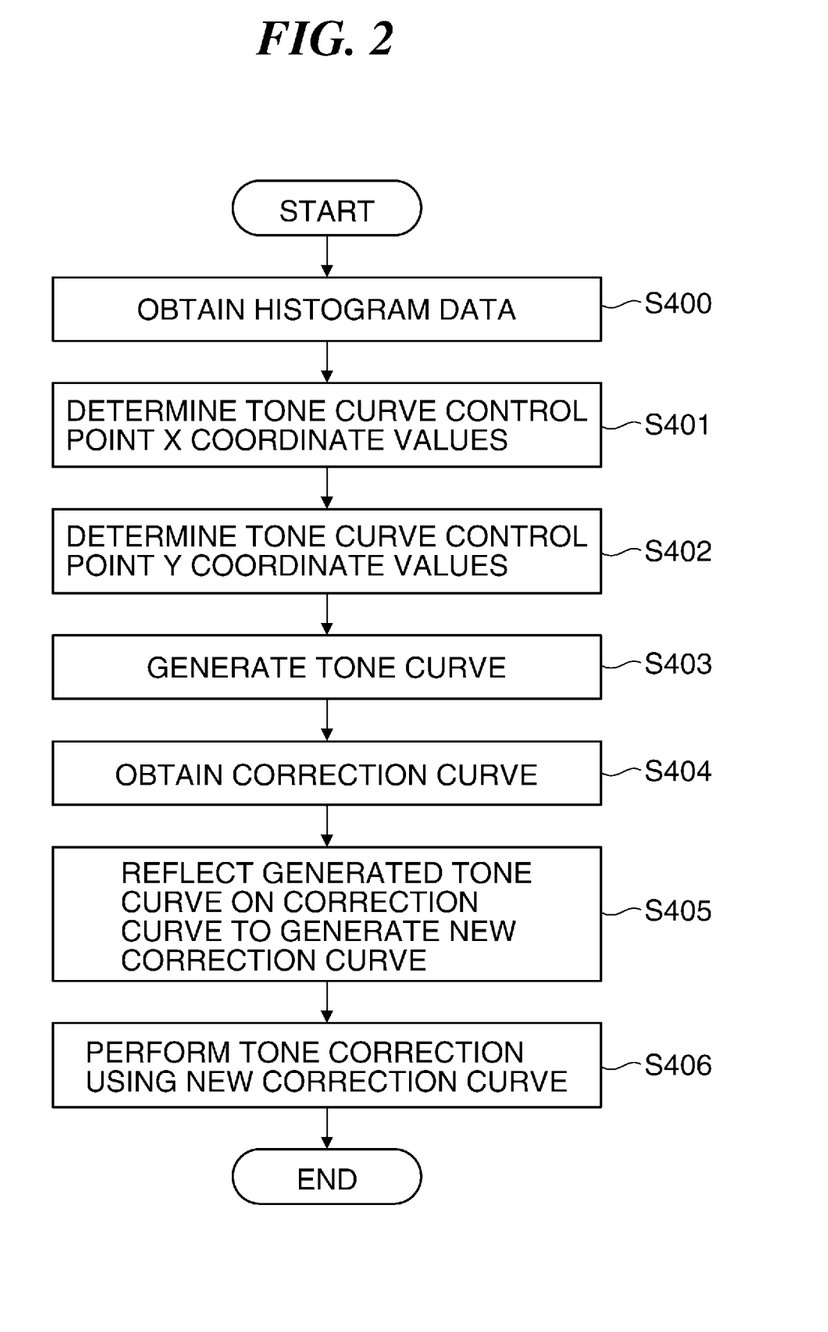
FIG. 2 is a flowchart showing an operating process which is carried out by the tone correction unit in FIG. 1.

FIG. 2 is a flowchart showing an operating process which is carried out by the tone correction unit in FIG. 1.

In step S400, the luminance tone control unit 40 obtains luminance histogram data from the luminance histogram obtaining unit 20.

In step S401, the luminance tone control unit 40 determines x coordinate values of control points on a tone curve based on the obtained luminance histogram data and correction intensity parameters sent from the user setting unit 50.

In step S402, the luminance tone control unit 40 determines y coordinate values of the control point on the tone curve based on the correction intensity parameters sent from the user setting unit 50. It should be noted that in the present embodiment, correction intensity parameters for use in determining y coordinate values of control points on a tone curve are independent from correction intensity parameters for use in determining x coordinate values of the control points on the tone curve.

In step S403, the luminance tone control unit 40 generates the tone curve using the x coordinate values of the control points on the tone curve determined in the step S401 and the y coordinate values of the control points on the tone curve determined in the step S402.

In step S404, the luminance tone control unit 40 obtains a correction curve from the luminance tone correction unit 30. This correction curve is stored in advance in memory of the luminance tone correction unit 30.

In step S405, the luminance tone correction unit 40 generates a new correction curve by reflecting the tone curve generated in the step S403 on the correction curve obtained in the step S404. Specifically, the luminance tone control unit 40 generates a new correction curve by multiplying a pre-correction correction curve by the tone curve generated in the step S403.

In step S406, the luminance tone control unit 40 outputs the new tone curve generated in the step S405 to the luminance tone correction unit 30. The luminance tone correction unit 30 subjects the image data to a tone correction process using the new correction curve. It should be noted that correction curves which the luminance tone correction unit 30 uses include tone curves and γ curves for providing various types of contrast control.

Figure 3:
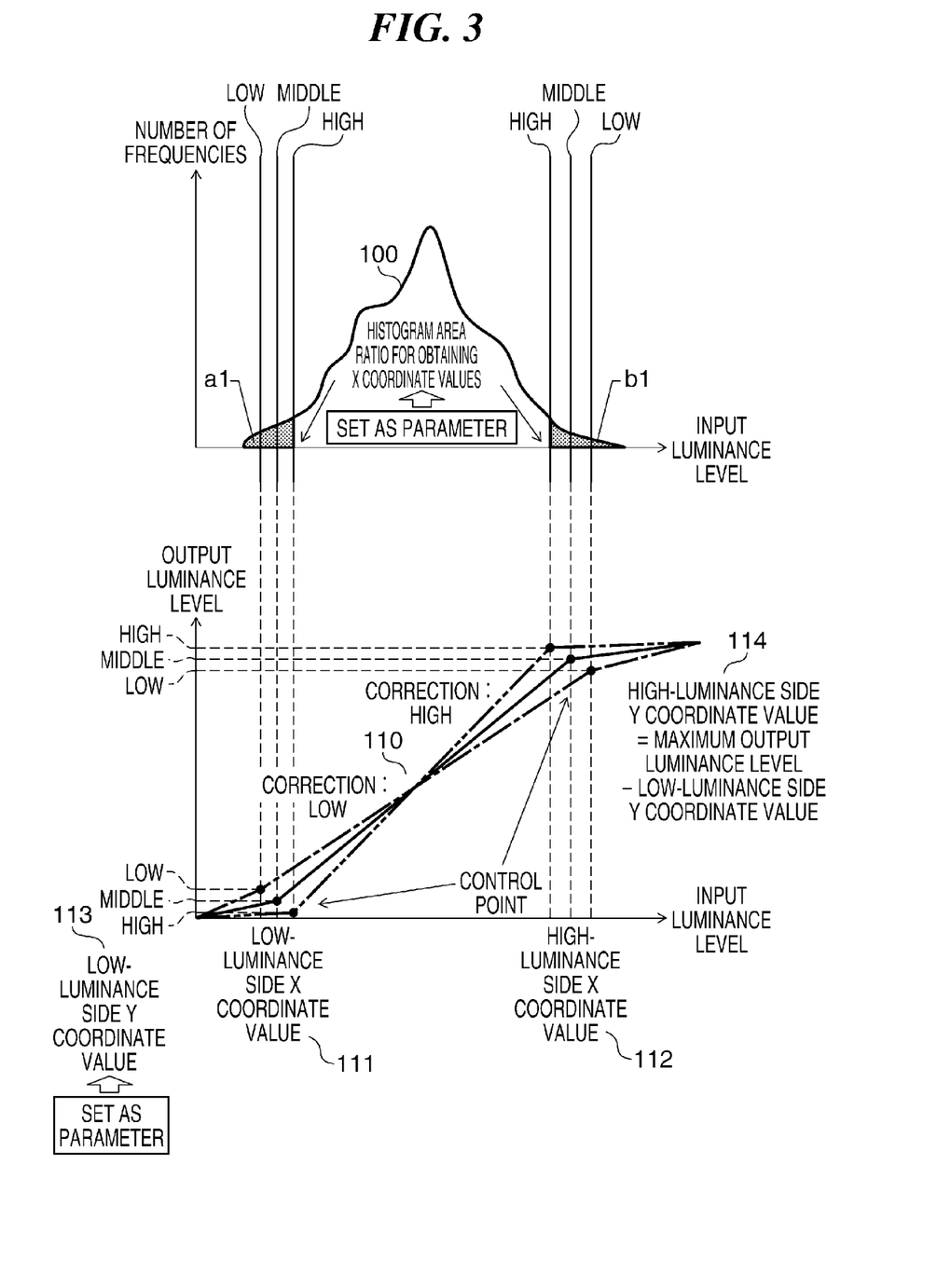
FIG. 3 is a view showing the relationship between a luminance histogram and a tone curve so as to explain a tone correction control method according to the first embodiment.

FIG. 3 is a view showing the relationship between a luminance histogram and a tone curve so as to explain a tone correction control method according to the first embodiment.

Referring to FIG. 3, x coordinate values of control points on a tone curve 110 are obtained based on an area a1 occupied by a low-luminance side and an area b1 occupied by a high-luminance side in the luminance histogram 100. Sizes of the area a1 (first area) occupied by the low-luminance side and the area b1 (second area) occupied by the high-luminance side in the luminance histogram 100 depend on a correction intensity (first correction intensity) set by the user.

For example, when the correction intensity is configured at "high", both the area a1 occupied by the low-luminance side and the area b1 occupied by the high-luminance side in the luminance histogram 100 increase. As a result, a low-luminance side x coordinate value 111 in FIG. 3 shifts rightward as viewed in the figure, and a high-luminance side x coordinate value 112 in FIG. 3 shifts leftward as viewed in the figure. On the other hand, when the correction intensity is configured at "low", both the area a1 occupied by the low-luminance side and the area b1 occupied by the high-luminance side in the luminance histogram 100 decrease. As a result, the low-luminance side x coordinate value 111 in FIG. 3 shifts leftward as viewed in the figure, and the high-luminance side x coordinate value 112 in FIG. 3 shifts rightward as viewed in the figure.

Namely, according to the correction intensity set by the user, a threshold value with which an area occupied by the low-luminance side is compared and a threshold value with which an area occupied by the high-luminance side is compared are changed. When the correction intensity set by the user is high, the threshold values are greater than when the correction intensity set by the user is low.

As described above, x coordinate values of the control points on the tone curve 110 vary not only according to the luminance histogram 100 of a taken image but also according to the correction intensity set by the user.

On the other hand, y coordinate values of the control points on the tone curve 110 are obtained based an output luminance level varying according to a correction intensity (second correction intensity), which is set by the user setting unit 50, using a predetermined percentage relative to a maximum value of the output luminance level of the tone curve as a reference value. For example, the reference value of the output luminance level is set at 90% (middle) on the high-luminance side relative to the maximum value and set at 10% (middle) on the low-luminance side relative to the maximum value. When the correction intensity is configured at "high", a low-luminance side y coordinate value 113 in FIG. 3 shifts downward as viewed in the figure, and a high-luminance side y coordinate value 114 in FIG. 3 shifts upward as viewed in the figure. On the other hand, when the correction intensity is configured at "low", the low-luminance side y coordinate value 113 in FIG. 3 shifts upward as viewed in the figure, and the high-luminance side y coordinate value 114 in FIG. 3 shifts downward as viewed in the figure. It should be noted that the high-luminance side y coordinate value 114 may be obtained using an equation (1) below.

$$\text{High-luminance side } y \text{ coordinate value} = \text{maximum value of output luminance level} - \text{low-luminance side } y \text{ coordinate value} \quad (1)$$

Namely, according to the correction intensity set by the user, a difference between the low-luminance side y coordinate value 113 and the low-luminance side y coordinate value 114 is changed. When the correction intensity set by the user is high, the low-luminance side y coordinate value 113 is smaller, and a difference between the low-luminance side y coordinate value 113 and the low-luminance side y coordinate value 114 is smaller than when the correction intensity set by the user is low.

As described above, x coordinate values and y coordinate values of control points on a tone curve on a low-luminance side and a high-luminance side are determined, and the tone curve 110 with spilt regions consisting of a low-luminance region, an intermediate-luminance region, and a high-luminance region is generated in the step S403 in FIG. 2.

According to the arrangement described above, both x coordinate values and y coordinate values of control points on a tone curve are changed according to a correction intensity set by the user setting unit 50, but targets to be changed should not be limited to them. For example, it may be arranged such that at least either x coordinate values or y coordinate values of control points on a tone curve are changed according to a correction intensity set by the user setting unit 50.

According to the first embodiment described above, the user setting unit 50 receives a setting as to a correction intensity of tone correction from the user, and according to this correction intensity, sends out parameters for use in determining coordinate values of control points on a correction curve. Then, a correction curve is generated based on a luminance histogram obtained from image data, and according to the parameters sent out from the user setting unit 50, coordinate values of control points on the correction curve are determined. This arrangement enables the user to vary the degree of correction effect when performing tone correction according to a luminance histogram of a taken image and set desired image quality.

A description will now be given of tone correction according to a second embodiment of the present invention, which makes it possible to control y coordinate values of control points on a tone curve through setting by a user. It should be noted that an image pickup apparatus according to the second embodiment of the present invention is the same as the image pickup apparatus according to the first embodiment described above in terms of the arrangement in FIG. 1 and the flowchart in FIG. 2, and hence description thereof will be given using FIGS. 1 and 2.

Figure 4:
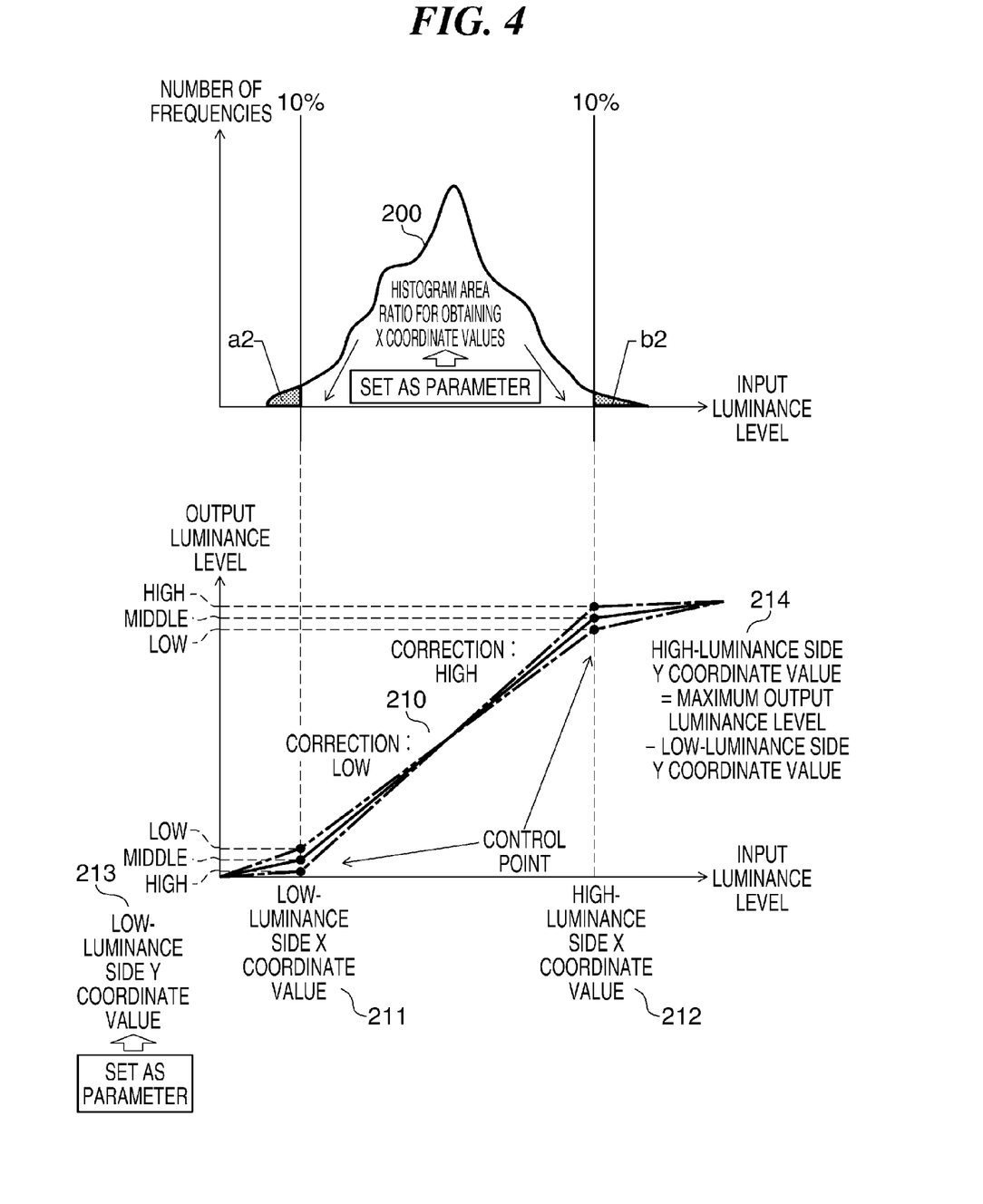
FIG. 4 is a view showing the relationship between a luminance histogram and a tone curve so as to explain a tone correction control method according to a second embodiment of the present invention.

FIG. 4 is a view showing the relationship between a luminance histogram and a tone curve so as to explain a tone correction control method according to the second embodiment of the present invention.

In the step S401 in FIG. 2, the luminance tone control unit 40 determines x coordinate values of control points on a tone curve based on obtained luminance histogram data and correction intensity parameters set by the user setting unit 50. The x coordinates of the control points on the tone curve are obtained based on an area a2 (first area) occupied by a low-luminance side and an area b2 (second area) occupied by a high-luminance side in a luminance histogram 200 in FIG. 4, but in the present embodiment, fixed values determined in advance are applied to sizes of the area a2 and the area b2.

Namely, the x coordinates of the control points on the tone curve 210 in FIG. 4 do not depend on settings configured by the user, and sizes of the area a2 and the area b2 occupied by the low-luminance side and the high-luminance side in the luminance histogram 200 are fixed (fixed values). In the example shown in the figure, percentages of the area a2 and the area b2 relative to the whole area of the luminance histogram 200 are set at 10%. It should be noted that as the state of a taken image changes, the form of the luminance histogram 200 also changes, and therefore, a low-luminance side x coordinate value 211 and a high-luminance side x coordinate value 212 in FIG. 4 shift leftward or rightward as viewed in the figure according to the state of the taken image.

In the step S402 in FIG. 2, the luminance tone control unit 40 determines y coordinate values of the control points on the tone curve based on a correction intensity set by the user setting unit 50. In the present embodiment, y coordinate values of the control points on the tone curve are obtained based on an output luminance level varying according to a correction intensity (second correction intensity), which is set by the user setting unit 50, using a predetermined percentage to a maximum value of the output luminance level of the tone curve as a reference value. For example, the reference value of the output luminance level is set at 90% (middle) on the high-luminance side and 10% (middle) on the low-luminance side relative to the maximum value.

When the correction intensity is configured at "high", a low-luminance side y coordinate value 213 in FIG. 4 shifts downward as viewed in the figure, and a high-luminance side y coordinate value 214 in FIG. 4 shifts upward as viewed in the figure. On the other hand, when the correction intensity is configured at "low", the low-luminance side y coordinate value 213 in FIG. 4 shifts upward as viewed in the figure, and the high-luminance side y coordinate value 214 in FIG. 4 shifts downward as viewed in the figure. It should be noted that the high-luminance side y coordinate value 214 may be obtained using an equation (2) below.

$$\text{High-luminance side } y \text{ coordinate value} = \text{maximum value of output luminance level} - \text{low-luminance side } y \text{ coordinate value} \quad (2)$$

As described above, x coordinate values and y coordinate values of control points on a tone curve on a low-luminance side and a high-luminance side are determined, and the tone curve 210 is generated in the step S403 in FIG. 2.

According to the second embodiment described above, the same effects as those in the first embodiment described above are obtained.

A description will now be given of tone correction according to a third embodiment of the present invention, which makes it possible to control x coordinate values of control points on a tone curve through setting by a user. It should be noted that an image pickup apparatus according to the third embodiment of the present invention is the same as the image pickup apparatus according to the first embodiment described above in terms of the arrangement in FIG. 1 and the flowchart in FIG. 2, and hence description thereof will be given using FIGS. 1 and 2.

Figure 5:
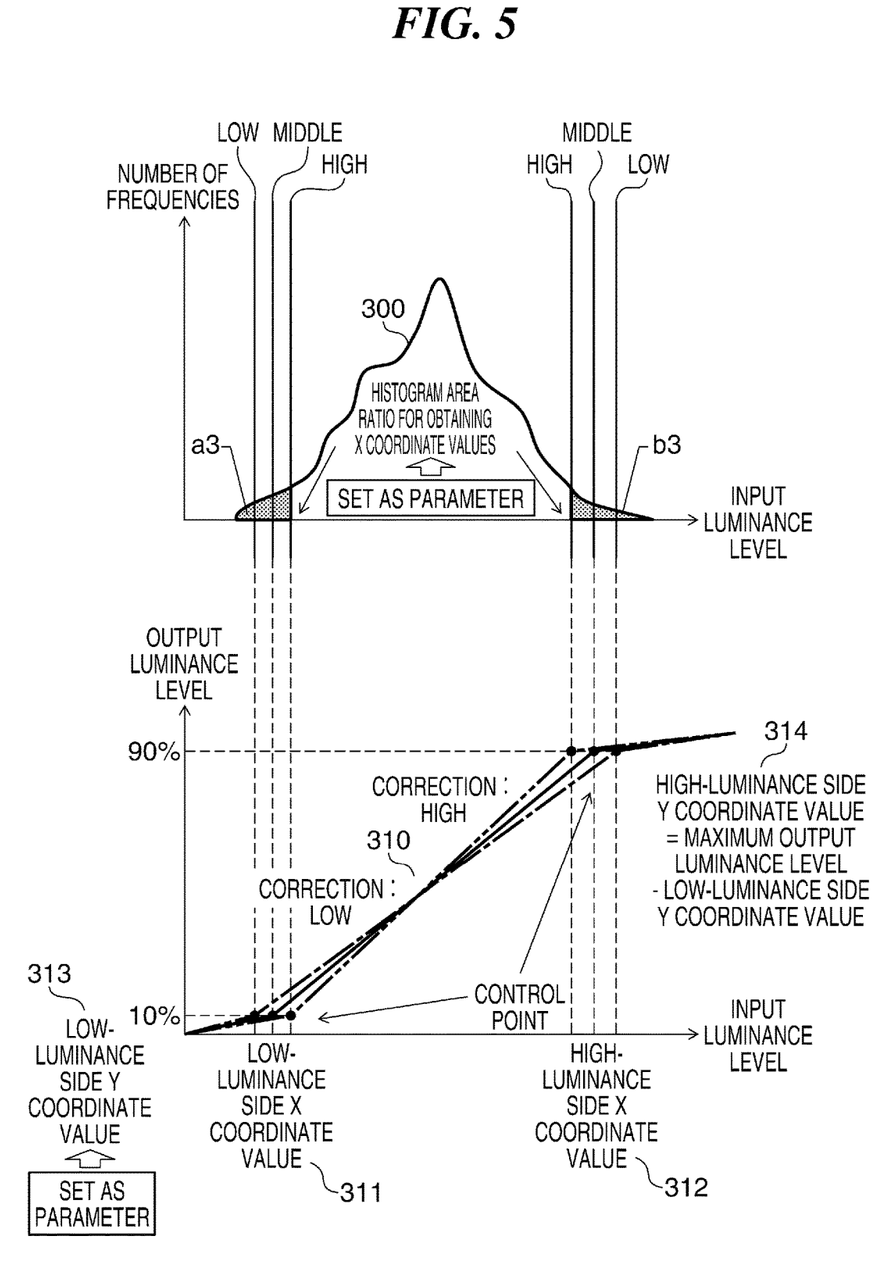
FIG. 5 is a view showing the relationship between a luminance histogram and a tone curve so as to explain a tone correction control method according to a third embodiment of the present invention.

FIG. 5 is a view showing the relationship between a luminance histogram and a tone curve so as to explain a tone correction control method according to the third embodiment of the present invention.

In the step S401 in FIG. 2, the luminance tone control unit 40 determines x coordinate values of control points on a tone curve based on obtained luminance histogram data and correction intensity parameters set by the user setting unit 50. In the present embodiment, the x coordinate values of the control points on the tone curve 110 are obtained based on an area a3 (first area) occupied by a low-luminance side and an area b3 (second area) occupied by a high-luminance side in the luminance histogram 300 in FIG. 5. Sizes of the area a3 occupied by the low-luminance side and the area b3 occupied by the high-luminance side in the luminance histogram 300 depend on a correction intensity (first correction intensity) set by the user using the user setting unit 50.

For example, when the user configures the correction intensity at "high", the area a3 occupied by the low-luminance side and the area b3 occupied by the high-luminance side in the luminance histogram 300 increase. As a result, a low-luminance side x coordinate value 311 in FIG. 5 shifts rightward as viewed in the figure, and a high-luminance side x coordinate value 312 in FIG. 5 shifts leftward as viewed in the figure. On the other hand, when the user configures the correction intensity at "low", the area a3 occupied by the low-luminance side and the area b3 occupied by the high-luminance side in the luminance histogram 300 decrease. As a result, the low-luminance side x coordinate value 311 in FIG. 5 shifts leftward as viewed in the figure, and the high-luminance side x coordinate value 312 in FIG. 5 shifts rightward as viewed in the figure.

As described above, x coordinates of the control points on the tone curve 310 vary not only according to the luminance histogram 300 of a taken image but also according to the correction intensity set by the user.

In the step S402, the luminance tone control unit 40 determines y coordinate values of control points on the tone curve based on a correction intensity set by the user setting unit 50. In the present embodiment, y coordinate values of the control points on the tone curve 310 are obtained based on a predetermined percentage relative to a maximum value of the output luminance level of the tone curve in FIG. 5. Namely, a low-luminance side y coordinate value 313 and a high-luminance side y coordinate value 314 in FIG. 5 are fixed without being dependent on settings configured by the user. In the example shown in the figure, the low-luminance side y coordinate value 313 is set at 10% of the maximum value of the output luminance level, and the high-luminance side y coordinate value 314 is set at 90% of the maximum value of the output luminance level.

As described above, x coordinate values and y coordinate values of control points on a tone curve on a low-luminance side and a high-luminance side are determined, and the tone curve is generated in the step S403 in FIG. 2.

According to the third embodiment described above, the same effects as those in the first embodiment described above are obtained.

A description will now be given of a tone correction method according to a fourth embodiment of the present invention, which controls characteristics of a tone curve according to settings configured by a user even when a luminance histogram obtaining unit 80 is placed in a stage subsequent to a luminance tone correction unit 70.

Figure 6:
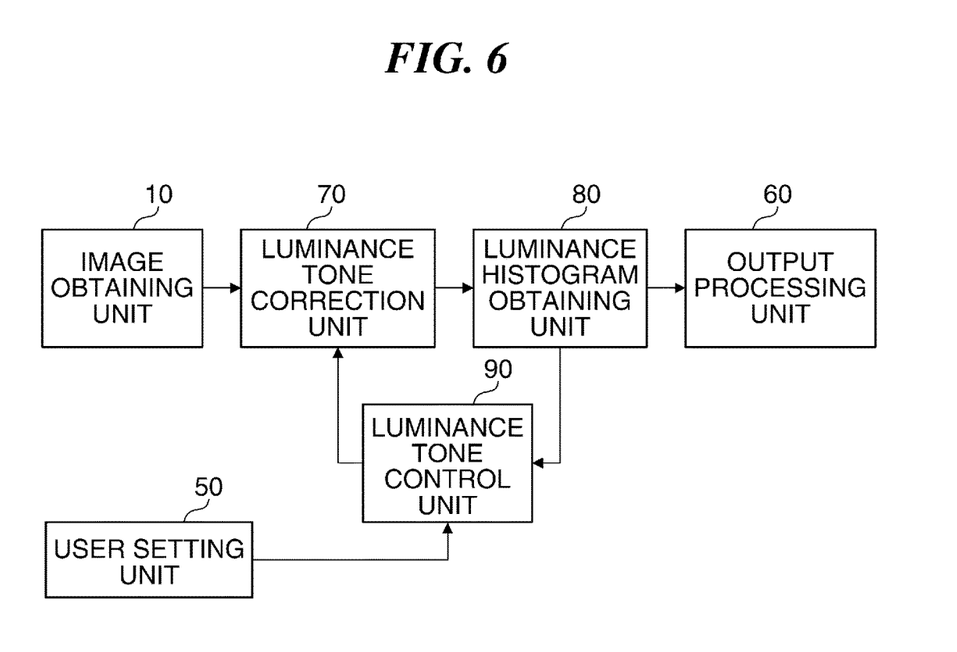
FIG. 6 is a block diagram schematically showing an arrangement of a tone correction unit which an image pickup apparatus according to a fourth embodiment of the present invention has.

FIG. 6 is a block diagram schematically showing an arrangement of a tone correction unit which an image pickup apparatus according to the fourth embodiment of the present invention has. It should be noted that component elements of the image pickup apparatus other than the tone correction unit are omitted from this figure.

Referring to FIG. 6, the tone correction unit has an image obtaining unit 10, the luminance tone correction unit 70, the luminance histogram obtaining unit 80, a luminance tone control unit 90, a user setting unit 50, and an output processing unit 60.

The image obtaining unit 10 obtains image data and outputs the same to the luminance tone correction unit 70. The luminance tone correction unit 70 subjects the image data input from the image obtaining unit 10 to tone correction based on a tone curve sent from the luminance tone control unit 90, to be described later. The luminance histogram obtaining unit 80 obtains a luminance histogram from the image data subjected to the tone correction by the luminance tone correction unit 70.

The luminance tone control unit 90 determines correction intensity parameters for use in controlling the intensity of luminance tone correction according to the luminance histogram obtained by the luminance histogram obtaining unit 80 and a correction intensity set by the user setting unit 50 and feeds the correction intensity parameters back to the luminance tone correction unit 70. The output processing unit 60 performs processing so as to receive the image data from the luminance histogram obtaining unit 80 and output the same from the image pickup apparatus.

Figure 7:
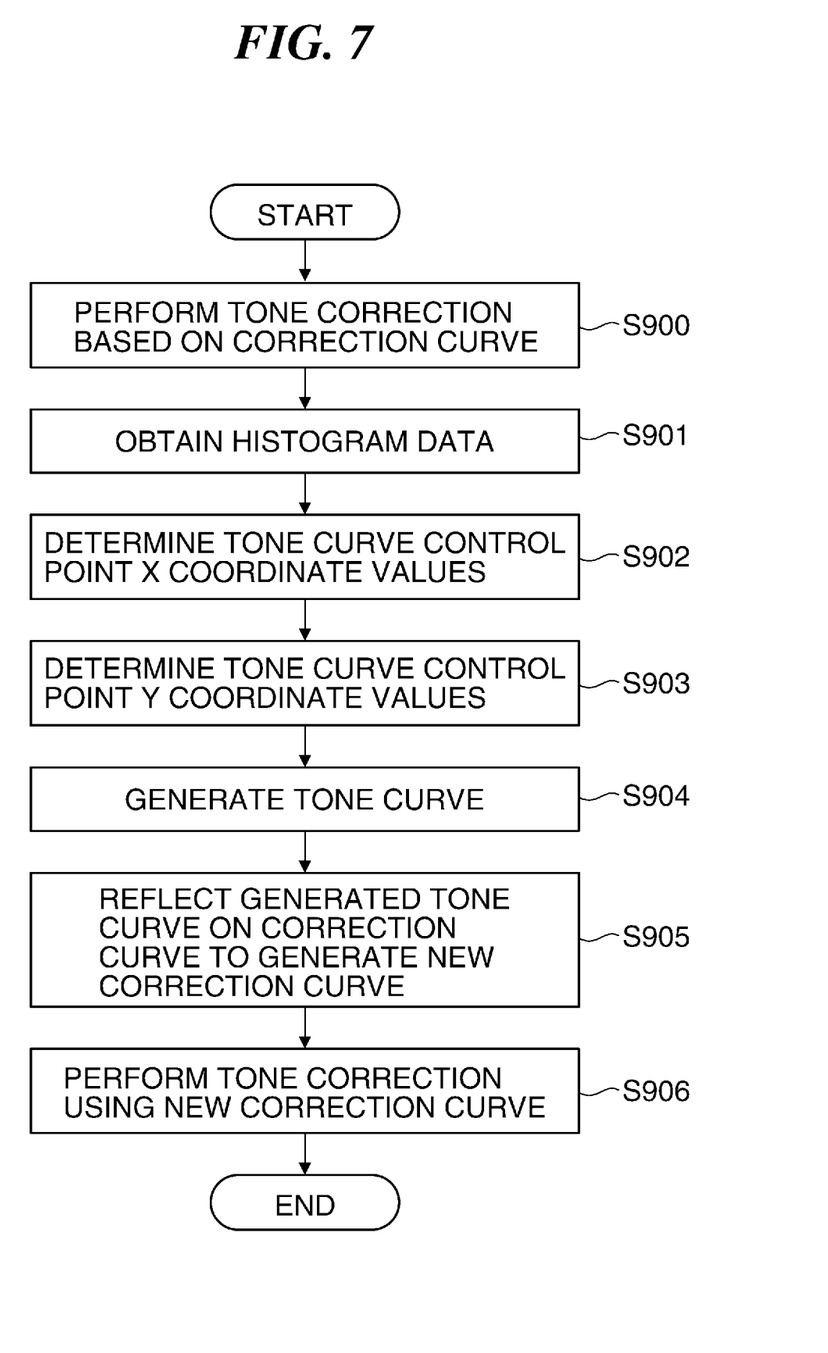
FIG. 7 is a flowchart showing an operating process which is carried out by the tone correction unit in FIG. 6.

FIG. 7 is a flowchart showing an operating process which is carried out by the tone correction unit in FIG. 6.

In step S900, the luminance tone correction unit 70 subjects image data input from the image obtaining unit 10 to tone correction based on a tone curve sent from the luminance tone control unit 90.

In step S901, the luminance histogram obtaining unit 80 obtains luminance histogram from the image data subjected to the tone correction by the luminance tone correction unit 70.

In step S902, the luminance tone control unit 90 determines x coordinate values of control points on the tone curve based on the obtained histogram data and a correction intensity set by the user setting unit 50.

In step S903, the luminance tone control unit 90 determines y coordinate values of the control points on the tone curve based on the correction intensity set by the user setting unit 50.

In step S904, the luminance tone control unit 90 generates a tone curve using the x coordinate values of the control points on the tone curve determined in the step S902 and the y coordinate values of the control points on the tone curve determined in the step S903.

In step S905, the luminance tone control unit 90 obtains a correction curve stored in the memory of the luminance tone correction unit 70 and reflects the tone curve generated in the step S904 on the correction curve to generate a new correction curve. Specifically, a new correction curve is generated by multiplying a pre-correction correction curve by the tone curve generated in the step S904.

In step S906, the luminance tone control unit 90 outputs the new correction curve generated in the step S905 to the luminance tone correction unit 70. The luminance tone correction unit 70 subjects the image data to a tone correction process using the new correction curve. It should be noted that correction curves which the luminance tone correction unit 70 uses include tone curves and γ curves for providing various types of contrast control.

There are two correction intensity parameters sent out from the user setting unit 50 to the luminance tone control unit 90. The first one is a parameter (first parameter) for determining x coordinate values of control points on a tone curve, and for example, sizes of an area occupied by a low-luminance side and a high-luminance side in a luminance histogram. The second one is a parameter (second parameter) for determining y coordinate values of control points on a tone curve, and for example, an output luminance level of a tone curve.

The user setting unit 50 provides control to vary at least one of these two parameters. This means that the relationship between a luminance histogram and a tone curve corresponds to one of those shown in FIGS. 3, 4, and 5. For example, when the correction intensity is configured at "high" in a case where x coordinate values of control points on a tone curve are to be varied, the low-luminance side x coordinate value 111 shifts rightward as viewed in the figure, and the high-luminance side x coordinate value 112 shifts leftward in the example shown in FIG. 3. On the other hand, when the correction intensity is configured at "high" in a case where y coordinate values of control points on a tone curve are to be varied, the low-luminance side y coordinate value 113 shifts downward as viewed in the figure, and the high-luminance side y coordinate value 114 shifts upward as viewed in the figure in the example shown in FIG. 3.

It should be noted that when the user setting unit 50 provides control to vary one of the two parameters described above, the other one is a fixed value.

According to the fourth embodiment described above, the same effects as those in the first embodiment described above are obtained even when the luminance histogram obtaining unit 80 is placed in a stage subsequent to the luminance tone correction unit 70.

Although in the first to fourth embodiments described above, parameters sent out from the user setting unit are sizes of areas occupied by a low-luminance side and a high-luminance side in a luminance histogram, an output luminance level of a tone curve, and so forth, the parameters should not be limited to them. For example, only a correction intensity may be a parameter sent out from the user setting unit. In this case, the luminance tone correction unit determines coordinate values of control points on a correction curve according to a correction intensity sent out from the user setting unit.

Moreover, in the four embodiments described above, a correction curve stored in advance is multiplied by a correction curve generated based on a luminance histogram to generate a new correction curve, and tone correction is performed based on the correction curve generated based on the luminance histogram. However, tone correction may be performed based on a correction curve generated based on a luminance histogram without multiplying a correction curve stored in advance by the correction curve generated based on the luminance histogram.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-207843, filed Oct. 9, 2014, which is hereby incorporated by reference herein in its entirety.

What is claimed is:

1. An image pickup apparatus comprising:
a processor; and
a memory for storing instructions that, when executed by the processor, cause the processor and the memory to function as:
an obtaining unit configured to obtain a luminance histogram from image data;
a correction unit configured to perform tone correction on the image data using a correction curve generated based on the luminance histogram obtained by said obtaining unit;
a setting unit configured to receive a setting as to a correction intensity of the tone correction from a user and set parameters for determining coordinate values of control points on the correction curve according to the correction intensity; and
a tone control unit configured to generate the correction curve based on the luminance histogram and determine the coordinate values according to the parameters set by said setting unit.

2. The image pickup apparatus according to claim 1, wherein said setting unit performs at least one of the following: a first setting according to which a first parameter is set so that x coordinate values of the control points on the correction curve increase or decrease according to a first correction intensity set by the user, and a second setting according to which a second parameter is set so that y coordinate values of the control points on the correction curve decrease or increase according to a second correction intensity set by the user.

3. The image pickup apparatus according to claim 2, wherein according to the first setting, the x coordinate values are obtained based on a first area occupied by a low-luminance side and a second area occupied by a high-luminance side in the luminance histogram obtained by said obtaining unit, and as the first correction intensity increases, the first area and the second area increase, and as the first correction intensity decreases, the first area and the second area decrease.

4. The image pickup apparatus according to claim 2, wherein according to the second setting, the y coordinate values are obtained based on an output luminance level varying according to the second correction intensity using a predetermined percentage relative to a maximum value of the output luminance level of the correction curve as a reference value, and as the second correction intensity increases, the y coordinate value becomes less than the reference value of the output luminance level, and as the second correction intensity decreases, the y coordinate value becomes greater than the reference value of the output luminance level.

5. The image pickup apparatus according to claim 2, wherein when said setting unit performs only one of the first setting and the second setting, said setting unit sets the parameter other than the parameter associated with the performed one of the first and second setting to a fixed value.

6. A control method for an image pickup apparatus, comprising:

obtaining a luminance histogram from image data;

performing tone correction on the image data using a correction curve generated based on the luminance histogram obtained in said obtaining;

receiving a setting as to a correction intensity of the tone correction from a user;

setting parameters for determining coordinate values of control points on the correction curve according to the correction intensity;

generating the correction curve based on the luminance histogram; and determining the coordinate values according to the parameters set in said setting.

7. A non-transitory computer-readable storage medium storing a program for causing a computer to execute a control method for an image pickup apparatus, the control method comprising:

obtaining a luminance histogram from image data;

performing tone correction on the image data using a correction curve generated based on the luminance histogram obtained in said obtaining;

receiving a setting as to a correction intensity of the tone correction from a user;

setting parameters for determining coordinate values of control points on the correction curve according to the correction intensity;

generating the correction curve based on the luminance histogram; and determining the coordinate values according to the parameters set in said setting.

* * * * *